(12) United States Patent
Weishaupt et al.

(10) Patent No.: US 11,421,872 B2
(45) Date of Patent: Aug. 23, 2022

(54) PREMIXING METHOD, COMBUSTION PRINCIPLE USING SAID METHOD AND PREMIXING DEVICE AND BURNER PROVIDED THEREWITH

(71) Applicant: Max Weishaupt GmbH, Schwendi (DE)

(72) Inventors: Thomas Weishaupt, Schwendi (DE); Tim Schloen, Ochsenhausen (DE)

(73) Assignee: Max Weishaupt GmbH, Schwendi (DE)

(*) Notice: Subject to any disclaimer, the term of this patent is extended or adjusted under 35 U.S.C. 154(b) by 439 days.

(21) Appl. No.: 16/483,178

(22) PCT Filed: Jan. 26, 2018

(86) PCT No.: PCT/EP2018/051994
§ 371 (c)(1),
(2) Date: Aug. 2, 2019

(87) PCT Pub. No.: WO2018/141647
PCT Pub. Date: Aug. 9, 2018

(65) Prior Publication Data
US 2020/0232639 A1    Jul. 23, 2020

(30) Foreign Application Priority Data
Feb. 2, 2017 (DE) ..................... 10 2017 102 085.3

(51) Int. Cl.
*F23C 7/00* (2006.01)
*F23D 14/02* (2006.01)
(Continued)

(52) U.S. Cl.
CPC ............. *F23D 14/02* (2013.01); *F23C 7/00* (2013.01); *F23D 14/34* (2013.01); *F23D 14/64* (2013.01); *F23D 14/82* (2013.01); *F23D 17/00* (2013.01)

(58) Field of Classification Search
CPC . F23C 7/00; F23D 14/34; F23D 14/64; F23D 14/82; F23D 14/02
(Continued)

(56) References Cited

U.S. PATENT DOCUMENTS 4,173,118 A * 11/1979 Kawaguchi ............... F23C 3/00
431/352
2004/0018461 A1   1/2004 Stephens et al.
(Continued)

FOREIGN PATENT DOCUMENTS

DE       1264668 B     3/1968
DE       2812511 A1    9/1979
(Continued)

*Primary Examiner* — Avinash A Savani
(74) *Attorney, Agent, or Firm* — United One Law Group LLC; Kongsik Kim; Jhongwoo Peck (57) ABSTRACT

The invention relates to a premixing method for premixing fuel with air prior to the combustion of a fuel/air mixture to allow burners to be operated at high output and with a good load variation range with stable and reliable operation and low NOx emissions. The method comprises: a) creating a rich fuel/air mixture with a fuel/air ratio above an ignitable fuel/air ratio, b) supplying air to the rich fuel/air mixture to obtain an ignitable fuel/air mixture, and c) swirling the ignitable fuel/air mixture obtained in step a) or b). The invention further relates to a premixing device for performing the method.

12 Claims, 5 Drawing Sheets

(51) Int. Cl.
*F23D 14/34* (2006.01)
*F23D 14/64* (2006.01)
*F23D 14/82* (2006.01)
*F23D 17/00* (2006.01)

(58) Field of Classification Search
USPC .......................................................... 431/5
See application file for complete search history.

(56) References Cited

U.S. PATENT DOCUMENTS

2004/0241601 A1   12/2004  Spicer
2007/0089417 A1*   4/2007  Khanna ..................... F23R 3/40
                                                               60/723
2007/0207426 A1    9/2007  Perry et al.

FOREIGN PATENT DOCUMENTS

| DE | 4216523 A1 | 12/1993 |
|----|------------|---------|
| DE | 4329971 A1 | 3/1995 |
| DE | 19850958 A1 | 5/2000 |
| EP | 2369231 A1 | 9/2011 |

\* cited by examiner

Fig. 5
Stand der Technik

Fig. 6
Stand der Technik

PREMIXING METHOD, COMBUSTION PRINCIPLE USING SAID METHOD AND PREMIXING DEVICE AND BURNER PROVIDED THEREWITH

CROSS-REFERENCES TO RELATED APPLICATIONS

This application is a U.S. national phase application, pursuant to 35 U.S.C. § 371, of PCT/EP2018/051994, filed Jan. 26, 2018, designating the United States, which claims priority to German Application No. 102017102085.3, filed Feb. 2, 2017. The entire contents of the aforementioned patent applications are incorporated herein by this reference.

The invention relates to a premixing method for premixing fuel with air prior to the combustion of a fuel-air mixture, a combustion process in which such a premixing method is first carried out, a premixing device and a burner provided with such a device.

The invention lies in the field of burners for buildings, trade and industry as well as combustion processes and mixing processes for mixing fuel and air that can be carried out using these processes. For the technological background, reference is made in particular to the following publications.

D1 Company brochure "WM 50 für Öl, Gas und Zweistoff" (WM 50 for Oil, Gas and Dual Fuels)
  Max Weishaupt GmbH, print no. 83215201, December 2016;
D2 Company brochure "WM 30 für Öl, Gas und Zweistoff" (WM 30 for Oil, Gas and Dual Fuels)
  Max Weishaupt GmbH, print no. 83211601, December 2016;
D3 Company brochure "WM 20 für Öl, Gas und Zweistoff" (WM 20 for Oil, Gas and Dual Fuels)
  Max Weishaupt GmbH, print no. 83211501, September 2016;
D4 Company brochure "WM 10 für Öl, Gas und Zweistoff" (WM 10 for Oil, Gas and Dual Fuels)
  Max Weishaupt GmbH, print no. 83211401, November 2015;
D5 Printout from Wikipedia, Wikipedia.org, definition of the term "Verbrennungsverhältnis" (combustion ratio);
D6 EP 2 713 105 A1
D7 EP 2 525 150 A1
D8 EP 2 286 149 B1.

From the brochures according to documents D1 to D4, burners for oil, gas and dual fuels (especially gas and oil) are known, the output of which can be adjusted over a wide range. For example, outputs between 800 kW and 1100 kW can be set; for the smaller WM 10 type, outputs between 55 kW and 1250 kW can be set. The publications D1 to D4 show forced-air burners. With the technologies shown in documents D1 to D4, $NO_x$ values of less than 80 mg/kWh for gas and less than 120 mg/kWh are achievable.

$NO_x$ emissions play a role in ozone depletion, global warming, acid rain generation and smog formation. As a result, the government regulations in different regions of the world are becoming stricter and stricter with regard to permissible $NO_x$ emissions.

While in the decade between 2000 and 2010 $NO_x$ emissions of 150 mg/$Nm^3$ of air (measured at 3% oxygen without exhaust gas recirculation) were permissible, since 2010 emissions of a maximum of 100 mg/$Nm^3$ ($Nm^3$ denotes standard cubic meters) have been required in many cases. Since 2015, 60 mg/$Nm^3$ have been demanded in some regions. It is expected that in some regions less than 30 mg/$Nm^3$ will be required.

The invention aims at reliably achieving such values in burners of the design type as shown in documents D1 to D4.

As one option to achieve such low $NO_x$ emissions, premixing burners with metal mesh have been proposed as shown for example in documents D7 and D8.

Another burner with a perforated surface at the outlet of a premixed fuel-air mixture is shown in document D6.

In a premixing burner, fuel and air are already mixed inside the burner head and thus mostly inside a burner tube or flame tube before combustion. A premixing process is a process that takes place in such a premixing burner to premix fuel and air.

The concept of a premixing burner with an external reaction body such as in particular a metal mesh offers very good $NO_x$ reductions, but this design is only suitable for gas and also only for burner capacities up to a maximum of 3 MW. The burners can only work with a high excess of air ($O_2$>6%). In particular, they have problems with contaminated combustion air. Therefore, the invention focuses on processes and devices without such reaction bodies. Preferably, burners according to the invention are not provided with metal mesh and also not with other reaction bodies.

For burners with higher outputs, premixing processes are therefore being evaluated in which a premixed fuel-air mixture is premixed in the burner tube or flame tube and swirled before it leaves the tube. The invention focuses on such burners and operating procedures for them.

Examples of well-known burners of this type are the "Nova Premix" and "Ultra C-Max" burners from the company of Powerflame available on the market and the SWRLmatic burner from the company of S.T. Johnson (www.johnsonburners.com) available on the market.

Figure 5:
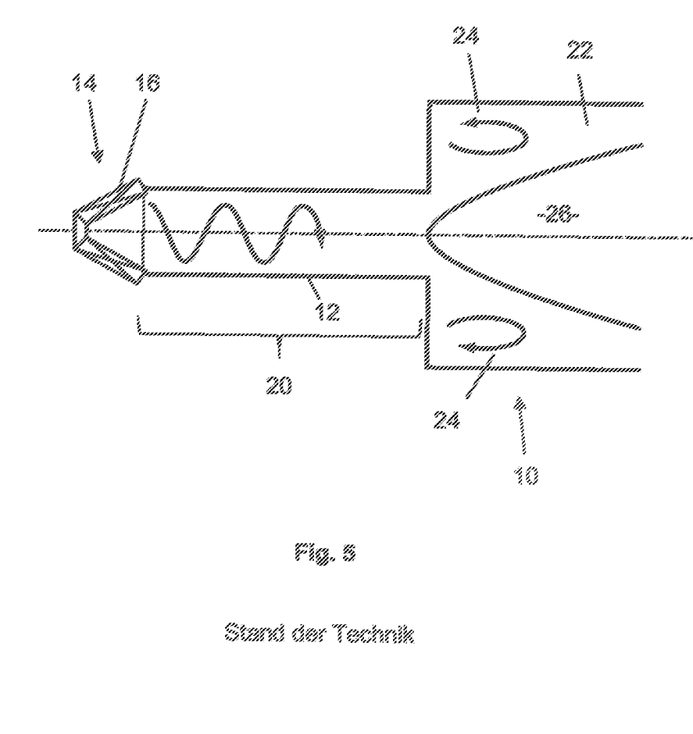
FIG. 5 a burner head with a premixing device according to prior art in a desired operating state.
Figure 6:
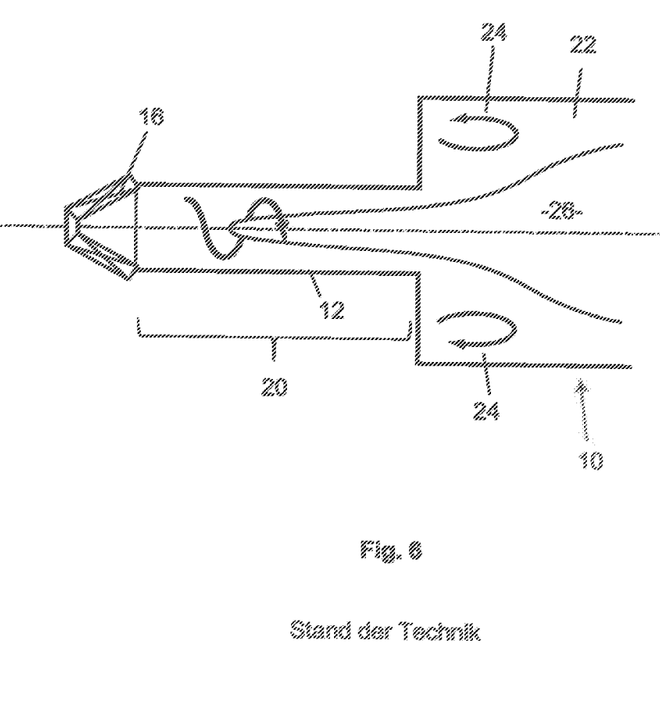
FIG. 6 the known burner head from FIG. 5, wherein a flashback is indicated as it can occur at low power below the nominal operating power.

A problem with premixing burners without metal mesh is illustrated in FIGS. 5 and 6 below.

FIGS. 5 and 6 show a burner head 10 with a flame tube or burner tube 12 and a premixing device 14 for premixing fuel and air, only one swirl generator 16 of the premixing device 14 being shown.

In the premixing device 14, fuel and air are premixed and swirled by device of the swirl generator 16 in order to achieve good mixing. FIG. 5 shows the desired operating condition in which a flame 20 is generated outside the burner tube 12 and thus outside a premixing zone 20 in the combustion chamber 22, and it is preferred here that an internal exhaust gas circulation 24 takes place. This can be achieved by optimizing the operating parameters of the burner, in particular the performance of an air blower, flow velocity and added fuel. If, however, the power point to which the burner is optimized is exceeded, there is a risk of flashback, as shown in FIG. 6. This is particularly the case with low output and low air flows. A flashback can damage internal parts of the burner, such as sensors or the like. Flashbacks should therefore be avoided as completely as possible.

For this reason, previous premixing burners, which in particular exhibit low $NO_x$ emissions even at higher outputs, can only be operated safely within a relatively narrow output range around the rated output.

An object of the present invention is to create methods and devices for reducing $NO_x$ emissions from burners in such a way that safe operation is possible even with different power outputs.

To solve this problem, the invention provides a premixing method according to claim 1 and a premixing device according to the further independent claim. Advantageous uses of the methods and the device according to the invention are specified in the additional independent claims.

Advantageous designs are the subject of the subclaims.

The invention provides a premixing method for premixing fuel with air prior to combustion of a fuel-air mixture, comprising:
- a) producing a rich fuel-air mixture having a fuel-air ratio above an ignitable fuel-air ratio; and
- b) supplying air to the rich fuel-air mixture to obtain an ignitable fuel-air mixture; and
- c) swirling of the ignitable fuel-air mixture.

In a particularly preferred variant, the invention provides a premixing method for premixing fuel with air prior to combustion of a fuel-air mixture, comprising:
- a) producing a rich fuel-air mixture having a fuel-air ratio above an ignitable fuel-air ratio; and
- b1) producing a lean fuel-air mixture having a fuel-air ratio below an ignitable fuel-air ratio and mixing said rich fuel-air mixture and said lean fuel-air mixture so as to obtain an ignitable fuel-air mixture, and
- c) swirling of the ignitable fuel-air mixture.

The premixing method is preferably carried out in a burner, in particular a forced-air burner, in buildings or ships or an industrial burner. In particular, the invention concerns premixing methods for combustion for heating purposes or for heating in industrial processes, with the exception of gas turbines. The invention also concerns devices for carrying out the premixing method, with the exception of devices for gas turbines.

The most preferred variant is an embodiment of the above aspect of the premixing method where step b) comprises step
- b1) producing a lean fuel-air mixture having a fuel-air ratio below an ignitable fuel-air ratio, wherein air is supplied to the rich fuel-air mixture by supplying the lean fuel-air mixture to the rich fuel-air mixture so as to obtain the ignitable fuel-air mixture.

Preferably, step a) comprises: generating an air flow and adding fuel, in particular gaseous fuel, to the air flow and mixing air and fuel along a premixing zone extending in the air flow direction.

Preferably the premixing process is carried out in a burner head at the end of which the combustion takes place. In particular, the premixing process is carried out in a flame tube or burner head tube.

Preferably, step a) comprises mixing a fuel with air to produce the fuel-air mixture along a rich-mixture premixing zone extending a distance in the direction of flow to effect good mixing.

Preferably, step b1) comprises mixing a fuel with air to form the lean fuel-air mixture along a lean-mixture premixing zone extending a distance in the direction of flow to effect good mixing.

Preferably the rich-mixture premixing zone and the lean-mixture premixing zone are spatially separated so that the mixing of the rich mixture and the mixing of the lean mixture takes place spatially separated from each other.

It is preferred that step a) comprises:
producing the rich fuel-air mixture with a combustion air ratio of $\lambda > 1.5$.

For the definition of the combustion air ratio $\lambda$ see document D5.

It is preferred that step b) comprises: producing the lean fuel-air mixture with a combustion ratio of $\lambda < 0.5$.

Particularly preferably, the rich fuel-air mixture with a combustion air ratio of $1.5 < \lambda < 20$ is produced.

Particularly preferably, the lean fuel-air mixture with a combustion ratio of $0.05 < \lambda < 0.5$ is produced.

It is preferred that step a) is carried out in a rich-mixture premixing zone extending in an air flow direction, at the front end of which in the air flow direction a rich-mixture fuel supply and a rich-mixture air supply take place and at the rear end of which in the flow direction the air of step b) is supplied.

It is preferred that step b1) is carried out in a lean-mixture premixing zone extending in the air flow direction, at the front end of which in the air flow direction a lean-mixture fuel supply and a lean-mixture air supply take place and at the rear end of which in the flow direction the supply to the rich fuel-air-mixture takes place.

It is preferred that the rich fuel-air mixture from the rich-mixture premixing zone and the lean fuel-air mixture from the lean-mixture premixing zone are mixed in a mixing zone extending in the direction of air flow and are supplied to a swirl generating device arranged behind the mixing zone in the direction of air flow for carrying out step c).

It is preferred that the lean-mixture premixing zone has a central area. It is preferred that the lean-mixture premixing zone has a plurality of outer regions arranged distributed around the central area.

It is preferred that the rich-mixture premixing zone comprises several separate channels located in a preferably annular distributed arrangement around a central area of the lean-mixture premixing zone. It is preferred that the separate channels of the rich-mixture premixing zone and the outer regions of the lean-mixture premixing zone are arranged alternately in the circumferential direction.

It is preferred that air or a lean air-fuel mixture is supplied at an upstream end of each channel and the rich fuel-air mixture is produced by supplying fuel in the channel, in particular at the upstream end, to the air or lean fuel-air mixture and mixing along the extent of the channel.

It is preferred that in step c) lean fuel-air mixture from the central region is swirled and that the swirling of the ignitable fuel-air mixture is effected by adding to the swirled lean fuel-air mixture and/or by adding rich fuel-air mixture to the swirled lean fuel-air mixture, so that an ignitable fuel-air mixture is generated in the swirled flow and the swirling of the ignitable fuel-air mixture takes place simultaneously with its generation.

It is preferred that step a) and/or b1) comprises:
supplying exhaust gas such that the rich or lean fuel-air mixture is a rich or lean fuel-air exhaust gas mixture.

According to another aspect, the invention concerns a combustion process for burning a fuel-air mixture, comprising carrying out the premixing process according to one of the preceding configurations and burning the swirled ignitable fuel-air mixture.

The combustion process is preferably carried out with the aid of a burner, preferably a forced-air burner, the premixing process being carried out in a burner head tube and the combustion taking place outside the burner head tube downstream of its end.

According to another aspect, the invention concerns a premixing device, in particular a premixing device for carrying out the premixing process according to one of the preceding designs.

The premixing device according to the invention comprises:
a rich-mixture premixing device for producing a rich fuel-air mixture, said rich-mixture premixing device comprising a rich-mixture air supply device for supplying air, a rich-mixture fuel supply device for supplying fuel, and a rich-mixture premixing zone for mixing air from said rich-mixture air supply device and fuel from said rich-mixture fuel supply device, and a mixing zone for mixing said rich fuel-air mixture with additional air to produce an ignitable fuel-air mixture, and swirl generating device for swirling said ignitable fuel-air mixture.

In a particularly preferred variant, the invention provides a premixing device comprising:

a rich-mixture premixing device for producing a rich fuel-air mixture, said rich-mixture premixing device comprising a rich-mixture fuel supply device for supplying fuel and a rich-mixture premixing zone for mixing air from said rich-mixture air supply device and fuel from said rich-mixture fuel supply device, a lean-mixture premixing device for producing a lean fuel-air mixture, said lean-mixture premixing device comprising a lean-mixture air supply device for supplying air, a lean-mixture fuel supply device for supplying fuel, and a lean-mixture premixing zone for mixing air from said lean-mixture air supply device and fuel from said lean-mixture fuel supply device, a mixing zone for mixing the rich fuel-air mixture from the rich-mixture premixing zone and the lean fuel-air mixture from the lean-mixture premixing zone to produce an ignitable fuel-air mixture, and a swirl generating device for swirling the ignitable fuel-air mixture.

This particularly preferred variant represents a particularly preferred design of the above-mentioned premixing device according to the invention.

It is therefore preferred that, in addition to the rich-mixture premixing device, a lean-mixture premixing device is also provided, both premixing devices opening jointly into the mixing zone in order to mix the rich fuel-air mixture and the lean fuel-air mixture to form the ignitable fuel-air mixture. In other words, air is added to the rich fuel-air mixture preferably by adding air contained in a lean fuel-air mixture.

It is preferred that an exhaust gas recirculation device is provided for supplying exhaust gas to the rich-mixture air supply device and/or the lean-mixture air supply device.

It is preferred that the rich-mixture premixing zone and/or the lean-mixture premixing zone have several channels extending in an air flow direction which are arranged side by side or alternately side by side.

It is preferred that the lean-mixture premixing zone has a central area, wherein at least regions of the rich-mixture premixing zone are arranged around the central area. In particular, the channels are distributed around the central area. An outer area of the lean-mixture premixing zone is preferably arranged between adjacent channels.

Preferably, each channel has tubular boundary walls, an upstream end having an inlet opening and a downstream end having an outlet opening. Preferably, a fuel nozzle is provided at a downstream end of each channel within the boundary walls.

According to a further aspect, the invention concerns a burner head comprising a burner tube and a premixing device arranged in the burner tube according to one of the configurations described above.

According to another aspect, the invention concerns a burner, in particular a forced-air burner, comprising a burner head of the configuration described above and/or a premixing device of one of the configurations described above.

Exemplary embodiments of the invention will be explained in more detail below using the attached drawings. In the drawings it is shown by.

First of all, the principle of preferred designs of methods and devices in accordance with the invention is explained on the basis of the illustrations in FIGS. 1 to 4.

Figure 1:
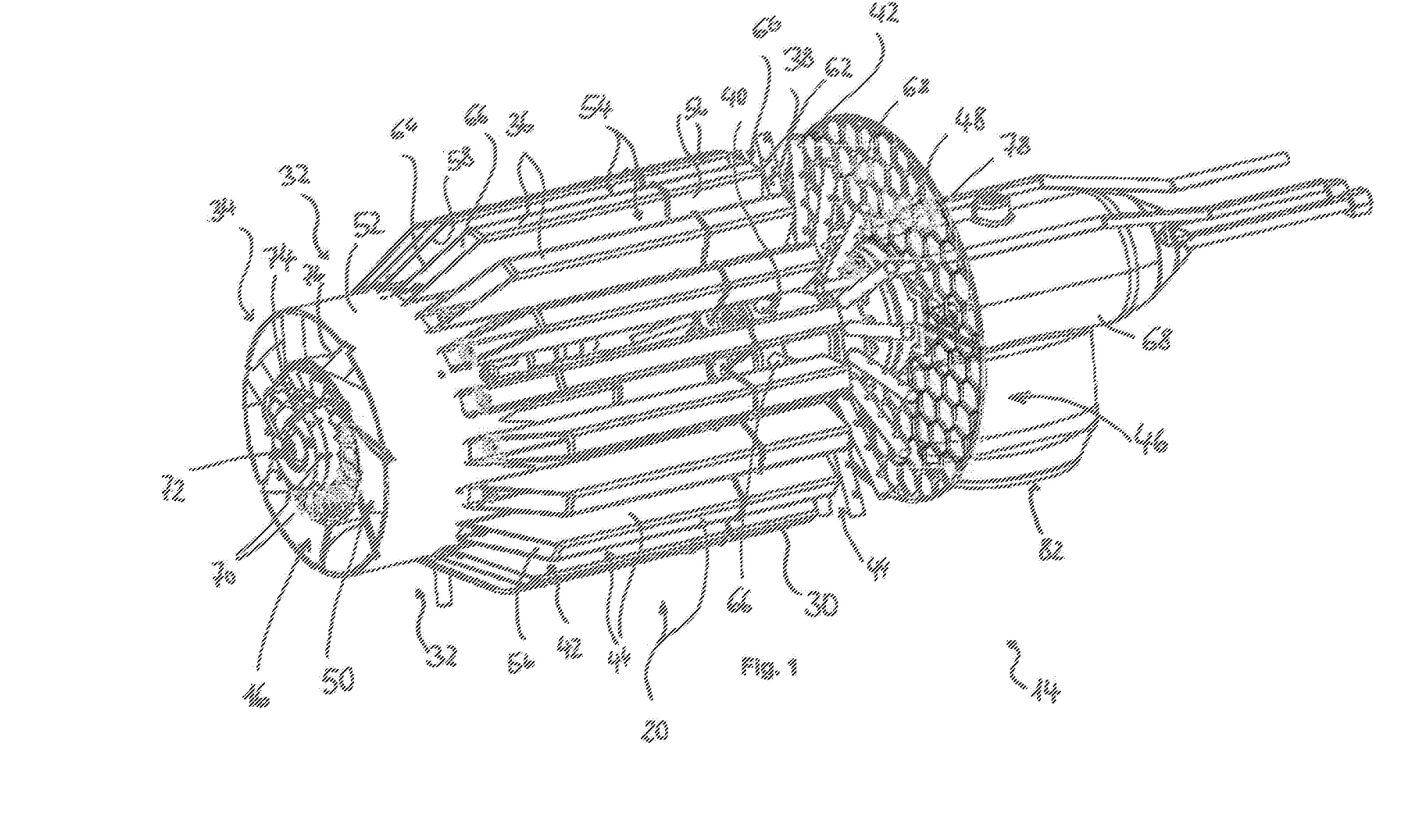
FIG. 1 a perspective view of a premixing device for premixing fuel and air prior to combustion.
Figure 2:
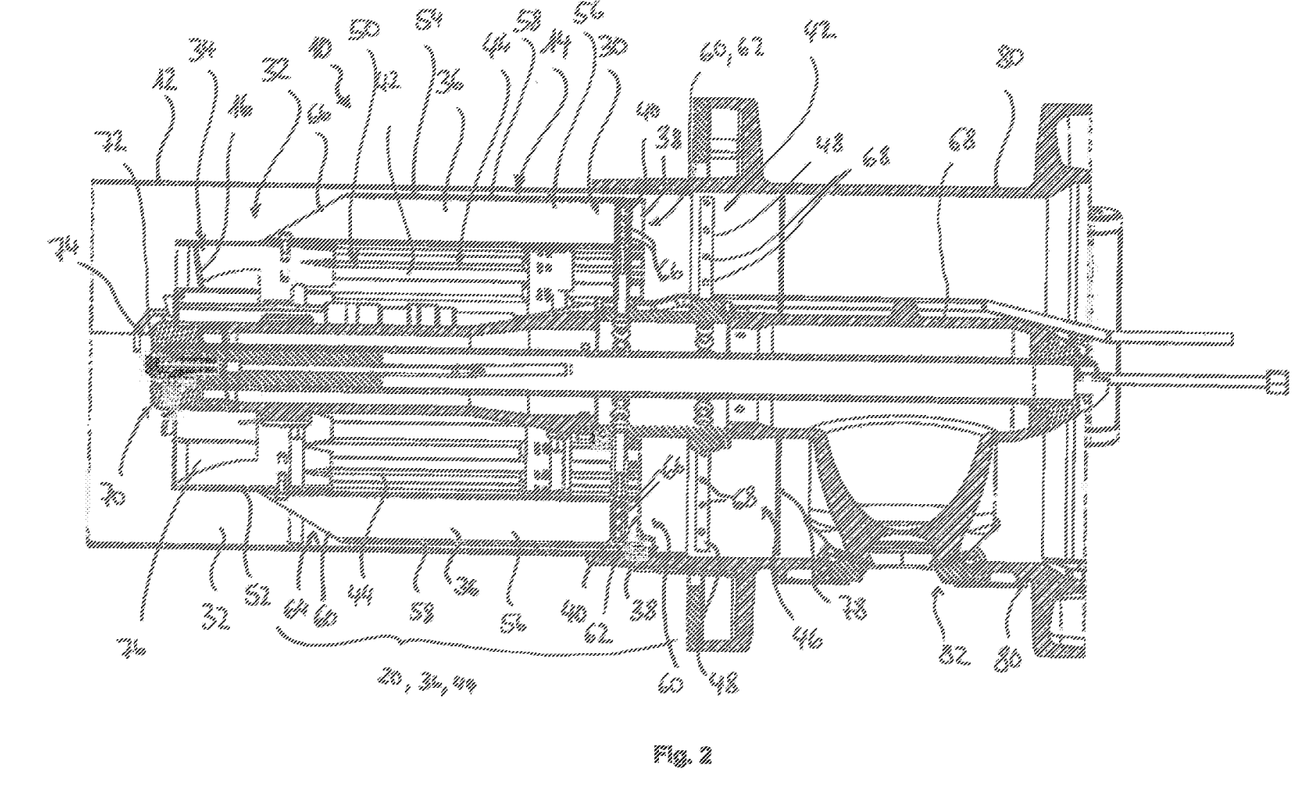
FIG. 2 a section through a burner head with a burner tube in which the premixing device of FIG. 1 is located.
Figure 3:
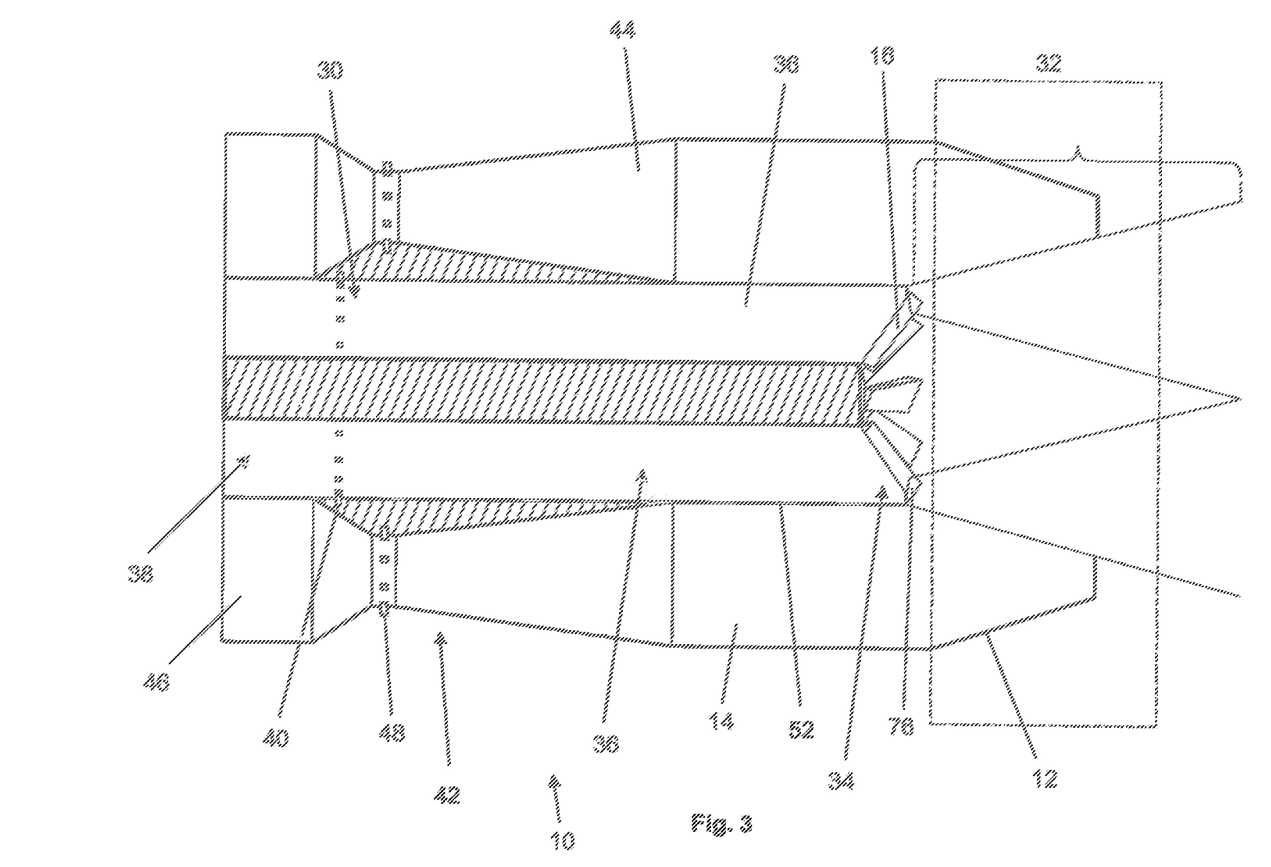
FIG. 3 a schematic, partially sectioned view of a burner head according to an alternative design for explaining the operating principle of the premixing devices shown here.
Figure 4:
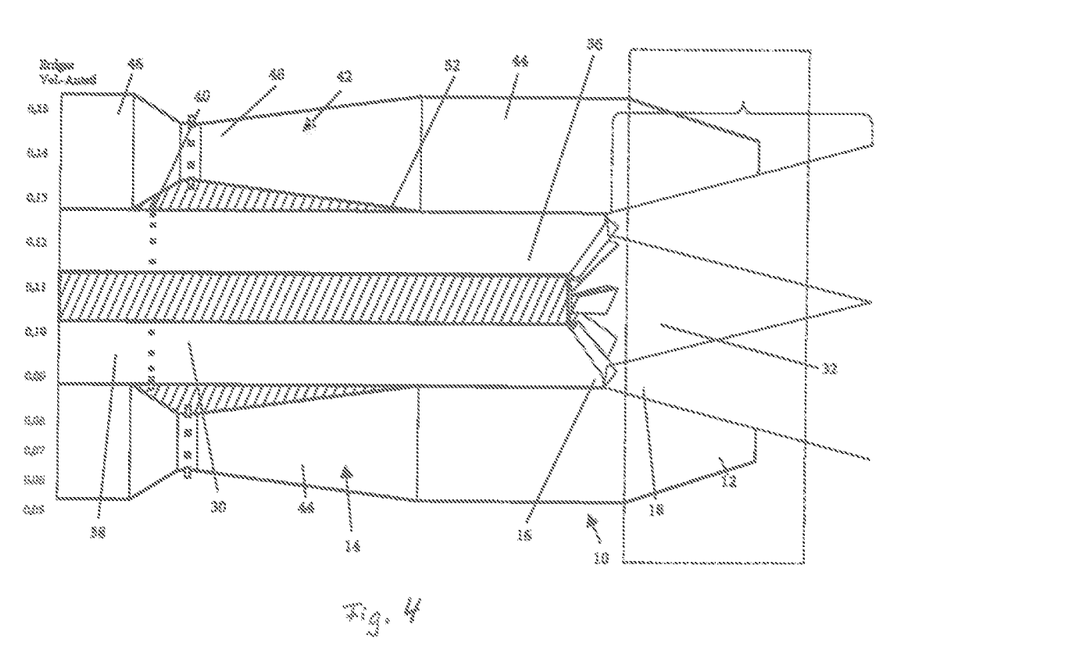
FIG. 4 a section through the burner head of FIG. 3 showing different fuel concentrations that occur during operation.

FIG. 1 shows one embodiment of a premixing device 14 for premixing fuel with air before combustion of a fuel-air mixture, which premixing device 14 has different premixing zones 36, 44. FIG. 2 shows the premixing device 14 in a burner head 10. FIGS. 3 and 4 show variants of the premixing device 14 and the burner head 10.

In particular, in the illustrated embodiments of the premixing device 14, a rich-mixture premixing device 30 is provided for producing a rich fuel-air mixture which has a fuel-air ratio above an ignitable fuel-air ratio, and a mixing zone 32 is provided for mixing the rich fuel-air mixture with additional air to produce an ignitable fuel-air mixture.

Furthermore, a swirl generating device 34 is provided for generating a swirl on the ignitable fuel-air mixture.

The rich-mixture premixing device 30 has a rich-mixture premixing zone 36, which is spatially separated from other zones of the premixing device 14.

Furthermore, the rich-mixture premixing device 30 has a rich-mixture air supply device 38 and a rich-mixture fuel supply device 40. The rich-mixture air supply device 38 supplies air to the rich-mixture premixing zone 36 and the rich-mixture fuel supply device 40 supplies fuel to the rich-mixture premixing zone 36.

As FIGS. 2, 3 and 4 show, the premixing device 14 is in particular designed to be arranged in a burner tube 12 of a burner head 10 of a forced-air burner, in which a fluid flow along the burner tube 12 is created by the fan. The rich-mixture premixing zone 36 extends downstream of the rich-mixture air supply device 38 and the rich-mixture fuel supply device 40, so that the supplied air and the supplied fuel are mixed to form the rich fuel-air mixture along the flow path of the rich-mixture premixing zone 36.

In designs of the premixing device 14 which are not shown in detail, pure combustion air is supplied to the mixing zone 32, so that an ignitable fuel-air mixture only occurs in the mixing zone 32 and is swirled by the swirl generating device 34.

In the case of the embodiments of the premixing device 14 shown in FIGS. 1 to 4, the additional air which is mixed in the mixing zone for mixing the rich fuel-air mixture to form an ignitable fuel-air mixture is not supplied as pure combustion air but as excess air in a lean fuel-air mixture which has a fuel-air ratio below an ignitable fuel-air ratio.

For this purpose, the premixing device 14 of the embodiments shown, for forming a further premixing zone, has a lean-mixture premixing device 42 which has a lean-mixture premixing zone 44 spatially separated from the rich-mixture premixing zone 36, in which the lean fuel-air mixture with the fuel-air ratio below an ignitable fuel-air ratio is created. This lean-mixture premixing device 42 and the corresponding lean-mixture premixing zone 44 also flow into the mixing zone, so that in the mixing zone the rich fuel-air mixture and the lean fuel-air mixture are mixed to form the ignitable fuel-air mixture, the swirl generating device 34 serving to generate a swirl in the ignitable fuel-air mixture.

To produce the lean fuel-air mixture, the lean-mixture premixing device 42 comprises a lean-mixture air supply device 46 for supplying air to the lean-mixture premixing zone 44 and a lean-mixture fuel supply device 48 for supplying fuel to the lean-mixture premixing zone 44.

The lean-mixture premixing zone 44 is spatially separated from the rich-mixture premixing zone 36 and also extends in the direction of flow over a certain distance, whereby the lean-mixture air supply device 46 and the lean-mixture fuel supply device 48 are formed at the upstream end so that fuel and air are thoroughly mixed along the path of the lean-mixture premixing zone 44 to produce the well mixed lean fuel-air mixture.

For example, the premixing zones 36, 44 extend over at least 10%, preferably at least 20%, of the longitudinal extent of the premixing device 14 or of the burner tube 12.

FIGS. 1 and 2 show a first embodiment of the premixing device 14, and FIGS. 3 and 4 show a further embodiment of the premixing device 14. As can be seen by comparison, the different premixing zones 36, 44 can be arranged differently for mixing the rich fuel-air mixture and the lean fuel-air mixture. While the rich-mixture premixing zone 36 is arranged centrally in the design of FIGS. 3 and 4 and the lean-mixture premixing zone 44 is arranged around the rich-mixture premixing zone 36, the design of the premixing device 14 shown in FIGS. 1 and 2 provides that the lean-mixture premixing zone 44 has a central region 50 within a tubular inner body 52 and several outer regions 54 which extend between channels 56.

The interior of the channels 56 forms areas of the rich-mixture premixing zone 36.

The channels 56 are formed by tubular boundary walls 58 which are open at their upstream end 60 to form an inlet opening 62 and are chamfered at their downstream end 64 and open to form outwardly sloping outlet openings 66.

Upstream of the upstream ends 60 of the channels 56, fuel nozzles of the lean-mixture fuel supply device 48 are formed in the form of first gas nozzles 68.

The first gas nozzles 68 are formed by radially protruding tubes with lateral gas outlet openings. Thus fuel, in particular gaseous fuel, is supplied to the air stream which is formed by the blower through the burner tube 12, the fuel supply of the lean-mixture fuel supply device 48 being introduced upstream of the inlet openings 62 of the individual regions of the rich-mixture premixing zone 36 formed by the channels 56, as shown in FIG. 1.

The upstream ends 60 form the rich-mixture air supply device 38. The rich-mixture fuel supply device 40 is formed by fuel nozzles which open at the end portion at the upstream ends 60 within the channels 56, namely within the boundary wall 58. These fuel nozzles are formed by second gas nozzles 66 in the embodiments shown.

In addition to the gas nozzles 66, the fuel supply devices 40, 48 have a gas distributor 68. The gas distributor 68, for example, is a gas pipe that extends inside the tubular inner body 52 through the premixing device 14.

The premixing device 14 shown has third gas nozzles 70 at its downstream end, which are also fed by the gas distributor 68.

The premixing device 14 shown is a premixing device for a dual fuel burner. For this purpose there is also shown at least one fuel nozzle for liquid fuel, e.g. an oil nozzle 72, with a nozzle head.

The oil nozzle 72, for example, is a central oil nozzle that opens into the center of the downstream end of the premixing zone 20 at a nozzle head 74.

At this nozzle head 74, where also the third gas nozzles 70 open, at least one ignition electrode 74 is provided.

The swirl generating device 34 has at least one swirl generator 16. In the example shown in FIGS. 1 and 2, the swirl generator 16 is formed at the downstream end of the tubular inner body 52 and has a swirl baffle plate 76.

A grid 78 is provided upstream of the fuel supply devices 40, 48, through the openings of which the combustion air can flow, but which reduces a residual risk of flame flashbacks towards the region upstream of the grid 78.

FIG. 2 shows the burner head 10 provided with the premixing device 14 according to FIG. 1, wherein the premixing device 14 is arranged in a flame tube or burner tube 12 of the burner head 10.

The burner tube 12 surrounds the channels 56 and delimits the outer regions 54 of the lean-mixture premixing zone 44 formed between the channels 56. FIG. 2 clearly shows the gas tubes for forming the first gas nozzles 68 of the lean-mixture fuel supply device 48 and the gas tubes for forming the second gas nozzles 66 of the rich-mixture fuel supply device 40.

The burner tube 12 is seated on a pivot flange 80 that is provided with a gas inlet 82 and that can be attached to one of the forced-air burners as shown and explained in detail in documents D1 to D4 instead of the pivot flanges shown in these documents and the burner tubes shown in these documents. By replacing the corresponding burner heads of the forced-air burners from documents D1 to D4 with a burner head according to FIG. 2 (or FIG. 3 or FIG. 4), embodiments of a burner according to the invention can be achieved. For further details on the corresponding burner, reference is expressly made to documents D1 to D4.

In the following, FIGS. 1 and 2 are used to explain in more detail a premixing method that can be carried out with the corresponding burner and burner head 10 and a combustion principle using this method.

During operation of the burner equipped with the burner head 10, an air flow is generated by the fan inside the pivot flange 80 and inside the flame tube or burner tube 12. Gaseous fuel is supplied through the gas inlet 82 and the gas distributor 38 to the first gas nozzles 68 of the lean-mixture fuel supply device 48 in such a ratio that downstream of the first gas nozzles 68 in the lean-mixture premixing zone 44 formed by the area upstream of the upstream ends 60 of the channels 56, the outer regions 54 between the channels 56 and the central area 50 within the tubular inner body 52, the lean mixture fuel supply device 48 is established. This produces a lean fuel-air mixture in the lean-mixture premixing zone 44 in such a way that it contains too little fuel and is therefore not ignitable.

An explosive air/gas mixture and thus an ignitable fuel-air mixture is present in natural gas with a concentration of 4.5 to 13.5%, in propane with a concentration of 2.1 to 95% and in butane with a concentration of 1.5 to 8.5%. The ignition points for natural gas are between 575° C. and 625° C. and for propane 470° C. and for butane 365° C.

Dimensioning of the first gas nozzles 68 ensures that gaseous fuel is supplied through the first gas nozzles at amount just enough that a lean fuel-air mixture with a concentration below the aforementioned ignitable gas concentration is achieved. For example, natural gas is supplied at less than 5%, preferably less than 4%, propane is supplied at less than 2%, and butane is supplied at less than 1.5%.

In particular, a gas-air mixture is produced in the lean-mixture premixing zone 44 with a combustion air ratio λ of less than 0.5. Of course, lower combustion air ratios can be provided.

However, it is advantageous to supply so much gas to the lean-air mixture premixing zone 44 that there is just no ignitable fuel-air mixture produced, but intimate mixing of fuel and air already takes place.

A part of the lean fuel-air mixture enters the channels 56 through the inlet openings 62, where additional fuel is added through the second gas nozzles 66. The second gas nozzles 66 are dimensioned to add enough fuel to create a mixture that is too rich to ignite. In particular, so much gas is added that gas mixtures above the upper limit of the above-mentioned concentrations for ignitable/explosive gas mixtures are achieved. In particular, a fuel-air mixture with λ>1.5 is produced.

The gas from the second gas nozzles 66 mixes very well with the air entering the inlet opening 62 as part of the lean fuel-air mixture along the flow through the channels 56, so that a very well mixed rich fuel-air mixture enters the mixing zone 32 formed between the outlet openings 66 and the downstream end of the premixing device 14 at said outlet openings 66.

The part of the lean fuel-air mixture flowing through the tubular inner body 52 is swirled by the swirl generator 16; this swirling also swirls the mixture forming in the mixing zone 32, so that altogether an ignitable fuel-air mixture is produced, at which a swirl is produced by the swirl generating device 34, by mixing the lean fuel-air mixture and the rich fuel-air mixture.

The third gas nozzles 70 add fuel to the portion of the lean fuel-air mixture flowing through the interior of the inner body 52, so that here too an ignitable mixture is produced only at the downstream end of the premixing device 14.

Furthermore, liquid fuel can be added through the oil nozzle 72.

Accordingly, spatially separated premixing zones 36, 44 are present inside the burner tube, with fuel-air mixtures residing or being produced and mixed in each of said premixing zones, the fuel-air ratios of which are outside the ignitable range. This avoids the risk of flame backflash, even at low powers or low flow velocities.

With this arrangement and with the premixing method that can be carried by this arrangement, a safe combustion process can be performed with which only very low $NO_x$ emissions are produced and with which high outputs (also above 3 MW) can be achieved, and a very large output range (several orders of magnitude) can be set while ensuring safe operation without flame flashback. Thus a low $NO_x$ burner with a high dynamic range can be created.

FIGS. 3 and 4 show a further design of the burner head 10 with the premixing device 14, where the rich-mixture premixing zone 36 is formed centrally, for example within the inner body 52, and the lean-mixture premixing zone 44 is arranged externally. Here, too, mixing for obtaining an ignitable mixture takes place only near the mouth of the burner tube 12.

The burners of the different embodiments can be operated with pure combustion air; however, it is also possible to provide an exhaust gas recirculation system (not shown) which supplies exhaust gases from the combustion chamber to the combustion air upstream of the air supply devices 38, 46 shown in FIGS. 1 to 4.

LIST OF REFERENCE NUMBERS 10 burner head
12 burner tube
14 premixing device
16 swirl generator
18 swirl flow
20 premixing zone
22 combustion chamber
24 internal exhaust gas circulation
26 flame
30 rich-mixture premixing device
32 mixing zone
34 swirl generating device
36 rich-mixture premixing zone
38 rich-mixture air supply device
40 rich-mixture fuel supply device
42 lean-mixture premixing device
44 lean-mixture premixing zone
46 lean-mixture air supply device
48 lean-mixture fuel supply device
50 central area
52 tubular inner body
54 outer region
56 channel
58 boundary wall
60 upstream end
62 inlet opening
64 downstream end
66 outlet opening
68 first gas nozzle
66 second gas nozzle
68 gas distributor
70 third gas nozzles
72 oil nozzle
74 ignition electrode
76 swirl baffle plate
78 grid
80 pivot flange
82 gas inlet

The invention claimed is:

1. A premixing method for premixing fuel with air prior to combustion of a fuel-air mixture, comprising:
    a) producing a rich fuel-air mixture having a fuel-air ratio above an ignitable fuel-air ratio;
    b) supplying air to the rich fuel-air mixture to obtain an ignitable fuel-air mixture; and
    c) swirling the ignitable fuel-air mixture obtained in step b),
    wherein step a) is carried out in a rich-mixture premixing zone extending in an air flow direction, at the front end of which in the air flow direction a rich-mixture fuel supply and a rich-mixture air supply take place and at the rear end of which in the air flow direction the air of step b) is supplied,
    wherein step b) comprises:
    b1) producing a lean fuel-air mixture having a fuel-air ratio below an ignitable fuel-air ratio,
    wherein the air is supplied to the rich fuel-air mixture by supplying the lean fuel-air mixture to the rich fuel-air mixture so as to obtain the ignitable fuel-air mixture, and
    wherein step b1) is carried out in a lean-mixture premixing zone extending in the air flow direction, at the front end of which in the air flow direction a lean-mixture fuel supply and a lean-mixture air supply take place and at the rear end of which in the air flow direction the supply to the rich fuel-air-mixture takes place.

2. The premixing method according to claim 1, wherein step a) comprises:

producing the rich fuel-air mixture with a combustion air ratio of $\lambda>1.5$ and/or step b1) comprises:

producing the lean fuel-air mixture with a combustion ratio of $\lambda<0.5$.

3. The premixing method according to claim 1, wherein the rich fuel-air mixture from the rich-mixture premixing zone and the lean fuel-air mixture from the lean-mixture premixing zone are mixed in a mixing zone extending in the air flow direction and are supplied to a swirl generating device arranged behind the mixing zone in the air flow direction for carrying out step c).

4. The premixing method according to claim 1, wherein step a) or b1) comprises:

supplying exhaust gas, so that the rich or lean fuel-air mixture is a rich or lean fuel-air-exhaust gas mixture.

5. The premixing method according to any one of the preceding claims, further comprising one or more or all of the following steps:

7.1 generating an air flow and adding fuel to the air flow and mixing air and the fuel along a premixing zone extending in the air flow direction as a part of step a);

7.2 carrying out the premixing process in a burner head at the end of which combustion takes place;

7.3 carrying out the premixing process in a flame tube or burner head tube or burner tube of a forced-air burner;

7.4 using the rich-mixture premixing zone having several separate channels arranged annularly distributed around a central area of a lean-mixture premixing zone;

7.4 mixing fuel and air in separate premixing zones, wherein the rich fuel-air mixture is produced in separate channels arranged distributed in the circumferential direction of a burner tube and wherein the lean fuel-air mixture is produced in a central area and in outer regions of a lean-mixture premixing zone, wherein said outer regions are arranged alternately with said channels;

7.5 supplying air or the lean fuel-air mixture at an upstream end of each channel and generating the rich fuel-air mixture by supplying fuel in the channel to the air and or the lean fuel-air mixture and mixing along the extent of the channel;

7.6 as part of step c): swirling the lean fuel-air mixture from a central area of a lean-mixture premixing zone and swirling the ignitable fuel-air mixture by adding to the swirled lean fuel-air mixture; and/or 7.7 as part of step c): swirling the lean fuel-air mixture form a central area of a lean-mixture premixing zone and swirling the ignitable fuel-air mixture by adding the rich fuel-air mixture to the swirled lean fuel-air mixture, so that the ignitable fuel-air mixture in the swirled flow is produced and swirling of the ignitable fuel-air mixture takes place simultaneously with its generation.

6. A combustion method for combustion of a fuel-air mixture, comprising:

carrying out the premixing method according to claim 1; and combustion of the swirled ignitable fuel-air mixture.

7. A premixing device, comprising:

a rich-mixture premixing device for producing a rich fuel-air mixture, said rich-mixture premixing device comprising a rich-mixture air supply device for supplying air, a rich-mixture fuel supply device for supplying fuel, and a rich-mixture premixing zone for mixing the air from said rich-mixture air supply device and the fuel from said rich-mixture fuel supply device;

a lean-mixture premixing device for producing a lean fuel-air mixture; and a mixing zone for mixing said rich fuel-air mixture with additional air to produce an ignitable fuel-air mixture, and a swirl generating device for producing a swirl at the ignitable fuel-air mixture, wherein the rich-mixture premixing zone extends in an air flow direction, at the front end of which in the air flow direction a rich-mixture fuel supply and a rich-mixture air supply take place and at the rear end of which in the flow direction the additional air to produce the ignitable fuel-air mixture is supplied, wherein the lean-mixture premixing device comprises a lean-mixture air supply device for supplying air, a lean-mixture fuel supply device for supplying fuel, and a lean-mixture premixing zone for mixing the air from the lean-mixture air supply and the fuel from the lean-mixture fuel supply device, and wherein both the rich-mixture premixing device and the lean-mixture premixing device together are open into the mixing zone to mix the rich fuel-air-mixture and the lean fuel-air mixture to form the ignitable fuel-air mixture.

8. The premixing device according to claim 7, further comprising an exhaust gas recirculation device for supplying exhaust gas to the rich-mixture air supply device and/or the lean-mixture air supply device.

9. The premixing device according to claim 7, wherein the rich-mixture premixing zone and/or the lean-mixture premixing zone have several channels extending in the air flow direction and disposed adjacent to each other or alternately adjacent to each other.

10. The premixing device according to claim 7, further comprising one or more or all of the following features:

13.1 that the lean-mixture premixing zone has a central area, wherein at least regions of the rich-mixture premixing zone are arranged around said central area;

13.2 that the rich-mixture premixing zone has channels which are arranged distributed around said central area;

13.3 that an outer region of the lean-mixture premixing zone is respectively arranged between adjacent channels;

13.4 that each channel has tubular boundary walls, wherein an upstream end of the channel has an inlet opening and a downstream end of the channel has an outlet opening; and/or 13.5 that a fuel nozzle is provided at a downstream end of a channel of the rich-mixture premixing zone within channel boundary walls.

11. A burner head, comprising a burner tube and the premixing device according to claim 7 arranged in said burner tube.

12. A burner, comprising the burner head according to claim 11.

* * * * *